April 23, 1935.  R. B. SIMNING  1,998,853
VEHICLE BODY STRUCTURE
Filed Jan. 10, 1929　　2 Sheets-Sheet 1
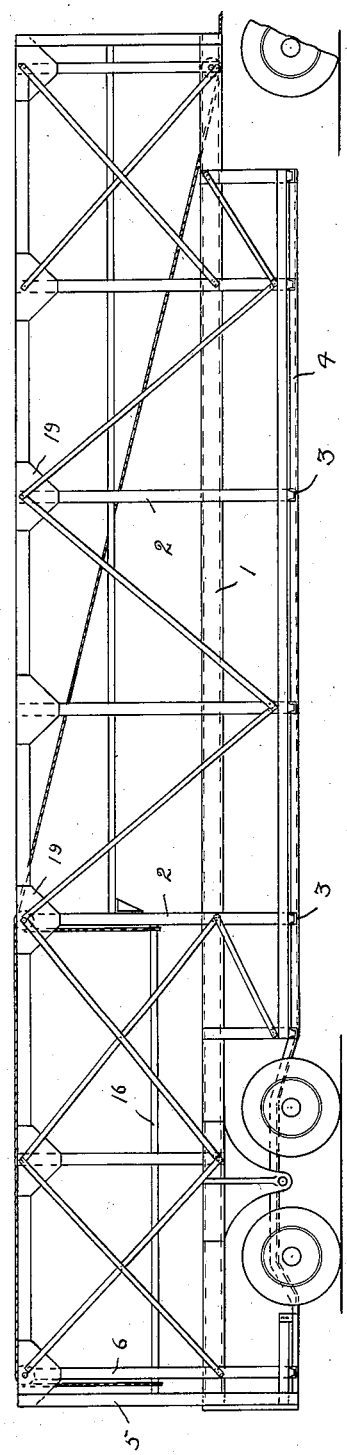
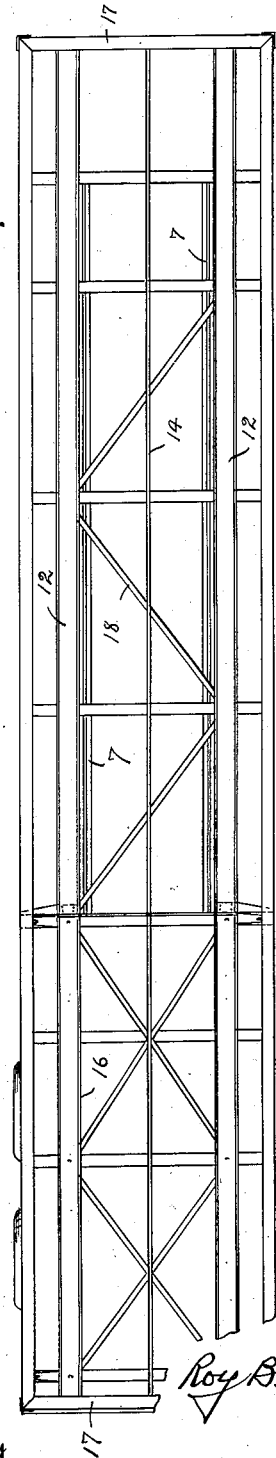
Inventor
Roy B. Simning.
By 
Attorney April 23, 1935.   R. B. SIMNING   1,998,853
VEHICLE BODY STRUCTURE
Filed Jan. 10, 1929   2 Sheets-Sheet 2
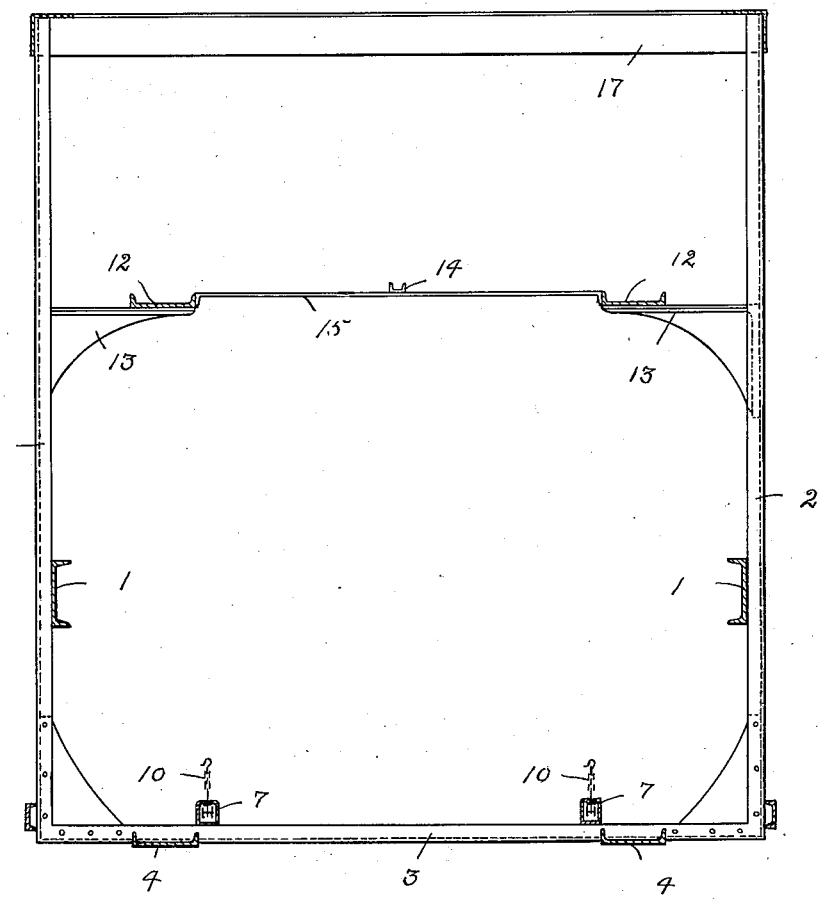
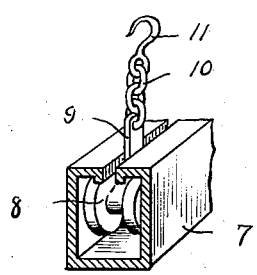
Inventor
Roy B. Simning.
By
Geo. Stevens.
Attorney Patented Apr. 23, 1935

1,998,853

UNITED STATES PATENT OFFICE 1,998,853

VEHICLE BODY STRUCTURE

Roy B. Simning, Duluth, Minn.

Application January 10, 1929, Serial No. 331,572

5 Claims. (Cl. 296—28)

This invention relates to vehicle chassis and has special reference to a novel form of chassis particularly adapted for use in the transportation of automobiles, and one which may be used as what is known as a semi-trailer, or, if preferred, a complete unit in itself.

The principal object is to provide a novel form of fabrication of chassis frame having novel characteristics especially adapted for the service intended.

Another object is to provide such a chassis conveniently accessible throughout, and upon which automobiles may be loaded, or unloaded from, with the maximum of expediency.

Another object is to provide novel means whereby abnormal positioning of the automobiles may be maintained during the loading and unloading of same.

Other objects and advantages of the invention will appear in the further description thereof.

Referring now to the accompanying drawings, forming part of this application and wherein like reference characters indicate like parts:

Figure 1 is a side elevation of a chassis embodying the invention.

Figure 2 is a top plan view of same.

Figure 3 is an enlarged sectional view through approximately the center of the chassis.

Figure 4 is an enlarged perspective view of one of the anchor channels.

The chassis frame is preferably of channel and angle iron fabrication and comprises the two principal longitudinal girders or supporting beams 1, there being one of such upon either side of the structure and extending from end to end thereof.

The preferred form of such girders is that of channels facing each other and carrying upon the backs thereof the upright smaller channels 2 which also face each other with their flanges abutting the backs of the girders 1.

These upright members 2 are spaced a substantially equal distance apart longitudinally of the frame, the four centermost ones extending downwardly some distance below the girders 1 and carrying upon the cross or floor members 3 thereof the runway channels 4; these latter being for the reception of automobiles carried in the device. The two rearmost uprights 5 and 6 also extend below the girders 1 the same distance as the central four just described, they also being for the support of the runways which being led rearwardly of the center of the frame are elevated somewhat to bridge the rear supporting axle or truck of the vehicle, as shown in dotted lines, Figure 1.

It will be noted that the cross beams 3 are let into the flanges of the runway channels 4 and the wheels of the vehicle in traversing said channels are required to surmount the cross beams 3. This however has proven not objectionable as the strength retained by such construction greatly outweighs any inconvenience in overcoming the obstruction in the runways.

Just inside of each of the runways 4 and on top of the flanges of the cross members 3 is fixed an anchor channel 7, it being similar to the substantially U-shaped channel used for the support of a horizontally movable door such as used in barn construction or the like. In each channel are mounted the requisite number of trolleys indicated at 8, each having an upstanding attaching member 9 to which is fixed a short length of chain 10 or the like terminating in a hook 11 which may be attached to the springs or under rigging of the automobile being transported in the vehicle; it being understood that such automobiles are in any desired and convenient manner depressed or fixed downwardly so that their springs are compressed, causing the automobiles to occupy less space for such transportation. These anchor channels which extend the full length of the depending or underslung portion of the chassis frame may be made to hold the automobile in such position irrespective of its longitudinal movement, it being necessary to keep the automobiles depressed at all times when beneath the upper runways 12 and supports therefor. These latter runways are carried upon suitable channel brackets 13 extending inwardly from the upright members 2, and supported intermediate thereof is the small anchor line supporting channel 14 upon relatively small transverse members 15, thus providing the greatest clearance possible for the lower tier of automobiles being carried.

As is obvious the upper runways or channels 12 are for the reception of an upper tier of automobiles which may or may not be carried depressed as circumstances require, and within the rearmost portion of the chassis is illustrated an elevator platform 16 for the handling of the uppermost tier of automobiles, and they may be held depressed or anchored in any desired manner, such as that described in my copending application Serial Number 306,426.

It will be noted that there are no cross-members whatever employed in the upper portion of the frame except at the ends thereof as shown at 17, they being a continuation of a comparatively deep angle which wholly surrounds the frame, and it is apparent that any number of diagonal braces illustrated at 18 may be employed for the strengthening of the structure, as well as suitable gusset plates or brackets indicated at 19.

As before stated this chassis frame may be employed as a semi-trailer, or a complete supporting vehicle in itself with but slight alteration and without departing from the invention involved therein.

Having thus described my invention, what I claim and desire to secure by Letters Patent, is:

1. A vehicle body structure including a principal girder upon either side of the structure immediately above the wheels thereof and supporting the entire structure, longitudinally spaced uprights fixed to said girders and extending both above and below the same, transverse members fixed to said uprights and brackets depending from said girders for supporting the vehicle wheels extending from side to side of the structure, and a deck supported by said transverse members below said girders.

2. A vehicle body structure including a principal girder rigidly fixed upon either side of the structure, immediately above, and in substantially the same vertical plane as the wheels thereof and supporting the entire structure, longitudinally spaced uprights fixed to said girders and extending both above and below the same, transverse members fixed to said uprights and extending from side to side of the structure, and decks supported upon said transverse members, one of said decks being below and another above said principal supporting girders.

3. A highway vehicle transport comprising a fabricated body structure including a principal girder upon either side thereof extending from end to end of said structure, brackets fixed to and depending from said girders for support of the road wheels of said transport, uprights fixed intermediate of their ends to said girders, transverse members fixed to said uprights at their lower ends, and transverse members fixed to said uprights above said girders, and vehicle runways supported upon both of said transverse members.

4. In a double-deck trailer for the transportation of automobiles, a rectangular fabricated frame structure therefor comprising spaced horizontal members, spaced vertical members fixed at their ends to the horizontal members, automobile supporting tracks upon the lower horizontal members, automobile supporting tracks supported by said vertical members above the lower tracks, a pair of main girders fixed to said vertical members intermediate of said supporting tracks, and traction wheels supported from said main girders.

5. In a vehicle body frame the combination of a pair of beams spaced horizontally and extending from end to end of the body frame, a plurality of vertical members for each beam spaced apart and fixed to each beam and extending both above and below their respective beam, transverse members connecting the lower ends of each registering pair of vertical members, transverse members connecting the upper ends of each end pair of vertical members, track members on the series of lower transverse members, the track members being arched upwardly near their rear ends to pass above the axle of the wheels upon which the body frame is mounted, alined brackets on the inside of each vertical member spaced vertically from the tracks, and a pair of upper track members, one for each side of the body frame carried by the brackets.

ROY B. SIMNING.